April 18, 1961 W. SPÜHL 2,980,149
CLAMPING DEVICE
Filed Nov. 25, 1957 4 Sheets-Sheet 1

INVENTOR:
WALTER SPÜHL
By
Richardson, Davis and Nerdon
ATTYS

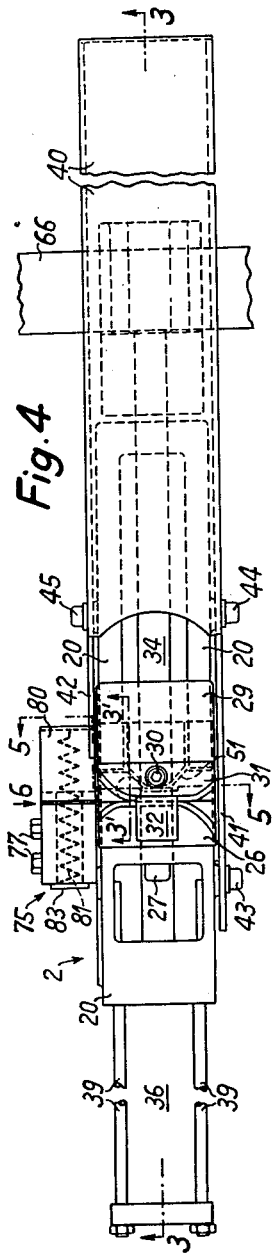
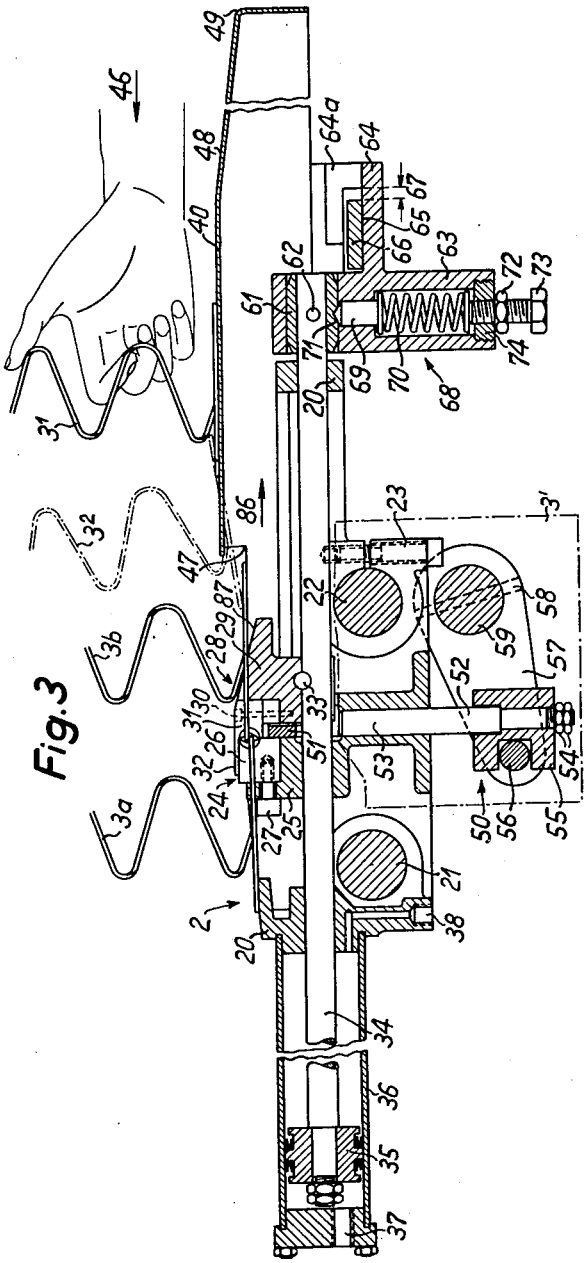

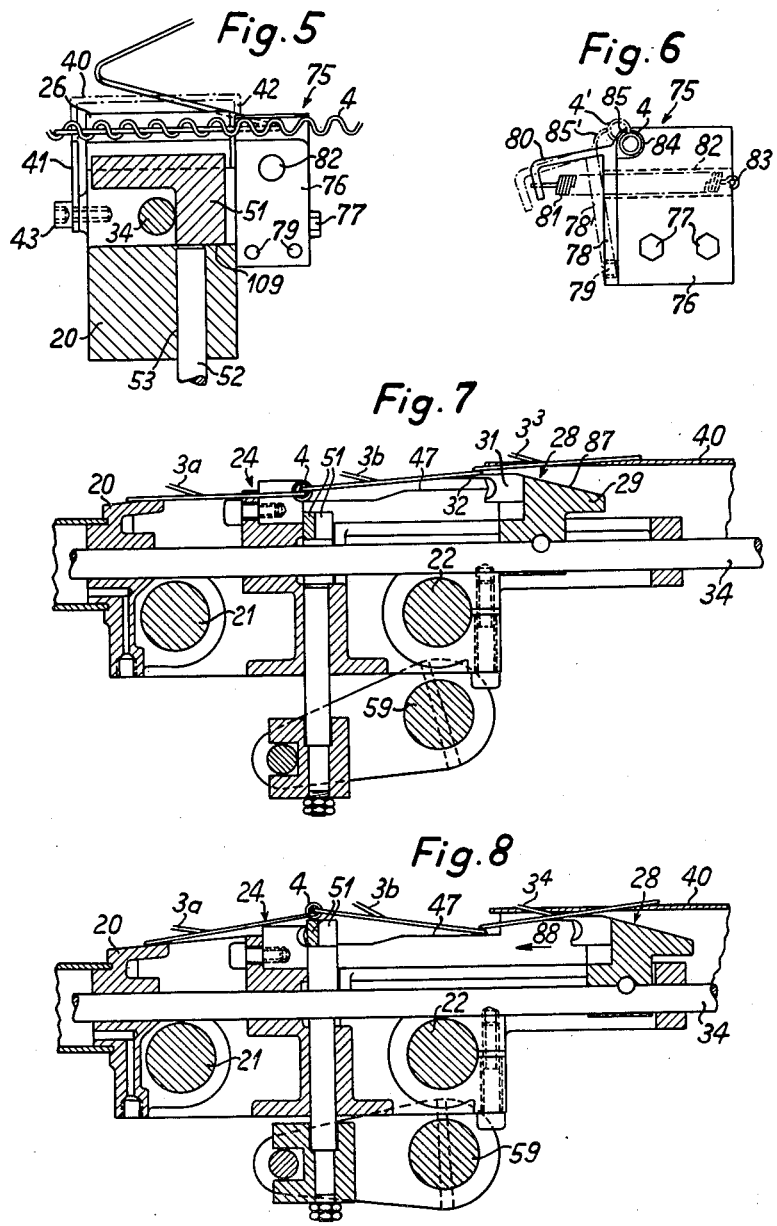

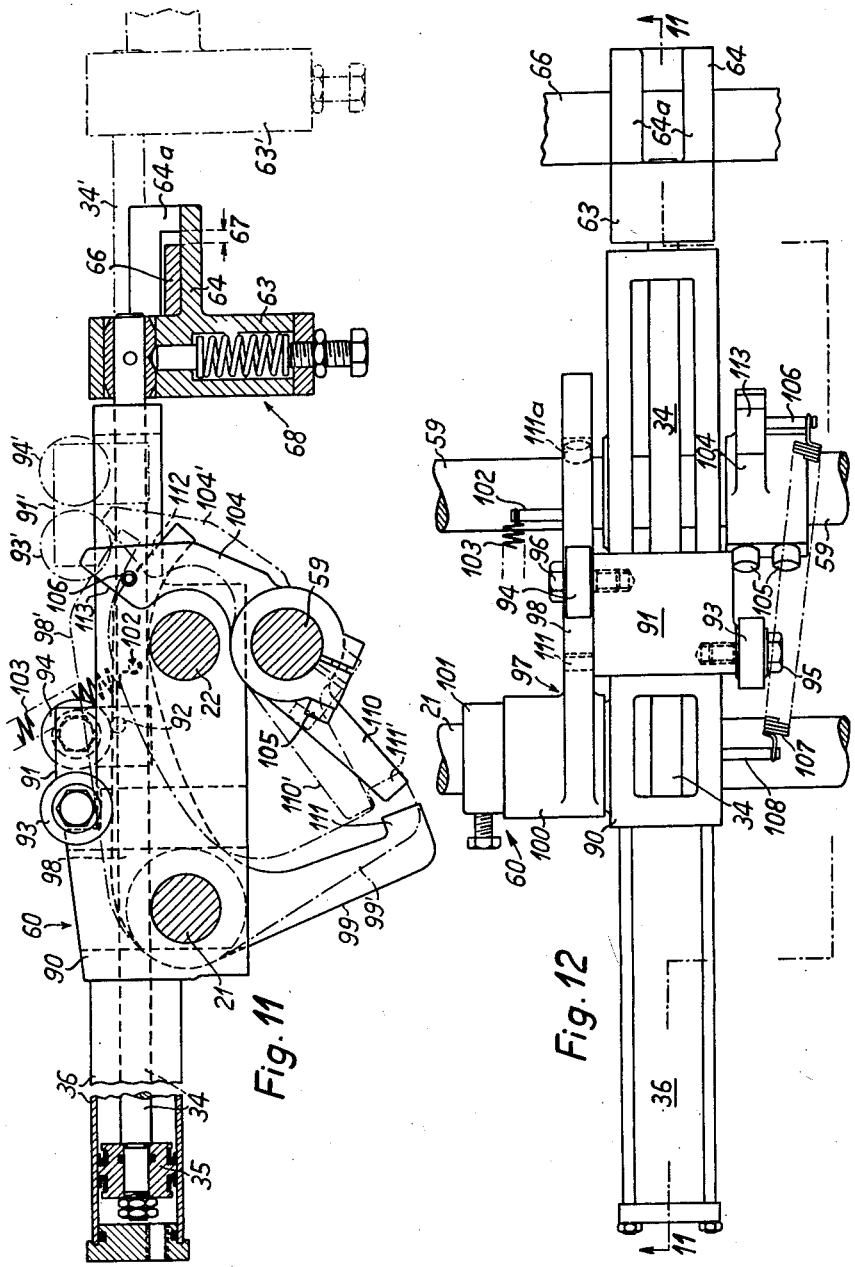

United States Patent Office 2,980,149
Patented Apr. 18, 1961

2,980,149
CLAMPING DEVICE
Walter Spühl, 9 Hompelistrasse, St. Gallen, Switzerland
Filed Nov. 25, 1957, Ser. No. 698,742
Claims priority, application Germany Mar. 18, 1957
12 Claims. (Cl. 140—92.8)

The invention relates to a clamping device, adapted to be supplied in advance, in a machine for the production of spring structures by attaching coiled springs to one another, which clamping device comprises two rows of clamping tongs arranged in pairs one above the other.

For the better understanding of the invention it will be firstly explained, how an ordinary machine for the production of spring structures is constructed and how it operates. Figs. 1 and 2 of the accompanying drawings represent in quite a diagrammatic manner an elevation and plan view, respectively, of some essential components of such a machine. The same comprises a clamping device 1 for the coiled springs, for example double-conical cushion springs, to be connected with one another. This clamping device consists of two rows of clamping tongs 2 lying one above the other in pairs, which are indicated in Fig. 1 only. In each pair of tongs two adjacent cushion springs 3a and 3b are to be clamped, the adjacent lower end turns of these springs being clamped in the lower tongs, and the adjacent upper end turns in the upper tongs. For the connection of the clamped together end turns two coiled wires 4 are provided which are produced by means of two winder devices 5, which move in the direction of the airrows 6 in Fig. 1 and in doing so coil themselves about the clamped-in end turns so that the latter are attached to one another. The coils 4 are produced from two wires 7 which are supplied to the winder devices 5 by feeder devices 8. When a coil 4 has reached its end position illustrated in Fig. 2, it actuates a switch contained in a switching-off and eye-forming device 9 which switches the corresponding feeder device 8 off over an electric circuit 10. Then on the end of the coil an eye is formed by the device 9, and the coil is cut-off by means of knives 11 indicated in Fig. 2 only. If desired at the end of the cut-off piece of coil connecting the cushion springs to one another yet another coil may be formed. The eyes secure the coiled wires from inadvertently screwing themselves out of the cushion springs, and prevent them from damaging the covering fabrics or causing injuries.

In the usual machines the pairs of cushion springs 3a, 3b, after having been connected with one another, have to be taken out by hand from the re-opened tongs 2, and the whole spring structure consisting of all the cushion springs and the coiled wires has to be shifted in the direction of the arrow 12 so that the springs 3b occupy the place formerly occupied by the preceding springs 3a. The springs 3b have to be checked for being correctly positioned in the tongs, which takes about 3 seconds. Then a new row of springs has to be inserted into the tongs 2 instead of the springs 3b, whereupon after the closing of the tongs the working cycle described repeats itself, so that a new row of springs is connected to the preceding rows of springs etc. until the spring body has attained the size desired.

The aforesaid operations to be carried out by hand require for a row of for example eight springs about twelve seconds. On the other hand the operative can not make use of the time during which the wire coils 4 advance screw-wise, a time which may for example amount to about four seconds. In order to increase the production of such a machine, it has therefore already been proposed to adapt the clamping device 1 for being fed in advance. In such a machine the springs of a new row of springs are brought by hand into a feed position in which they are automatically caught by the closing tongs. The feeding of the clamping device may be effected while the coiled wires 4 advance so that the corresponding idle time of four seconds can be obviated and moreover the time of about three seconds required for checking the coils in the clamping position is saved.

The clamping device of this known machine, however, is extraordinarily complicated. In particular each pair of clamping tongs comprise two moveable jaws each of which is moved horizontally as well as vertically in order to clamp adjacent coiled springs together at their end turns, and to release them again after their connection by the coiled wires has been effected. The known design is so complicated, liable to break-downs and is so expensive that one has hitherto mostly done without the advance feed of the clamping device in spite of consequent lower production.

The present invention has the main object of providing a clamping device capable of being fed in advance which overcomes these disadvantages.

With this and other objects, which will become apparent hereinafter, in view I provide, in a machine for the production of spring structures by attaching coiled springs to one another, a clamping device adapted to be fed in advance, comprising in combination: two rows of clamping tongs lying in pairs one above the other, each of the said tongs having a pair of jaws moveable relative to one another in one direction only and a pneumatic jack operatively connected to the said jaws in the sense of opening and closing the same, each of the said tongs being adapted to automatically engage in its opened position an end turn of a coiled spring brought into its feed position, and in its closing movement to clamp the said end turn together with an end turn of a preceding coiled spring.

The preferred form illustrated in Figs. 3 to 12 of a clamping device according to the invention has moreover numerous new features as will be clear from the following description.

In the drawings:

Fig. 3 is a section of a pair of clamping tongs on the line 3—3 of Fig. 4, the range 3' corresponding however to the section line 3'—3' of Fig. 4;

Fig. 4 is a plan view of the clamping tongs on an enlarged scale;

Fig. 5 is a section on the line 5—5 of Fig. 4;

Fig. 6 is a view of a detail viewed in the direction of arrow 6 of Fig. 4, Figs. 5 and 6 being on the same scale as Fig. 4;

Figs. 7 to 10 show the middle part of Fig. 4 for various positions of the moveable jaw of the tongs and of the ejector device;

Fig. 11 is a section on the line 11—11 of Fig. 12 of a rocker device serving for the operation of the ejector device, and Fig. 12 is a plan view of the said rocker device.

Figure 1:
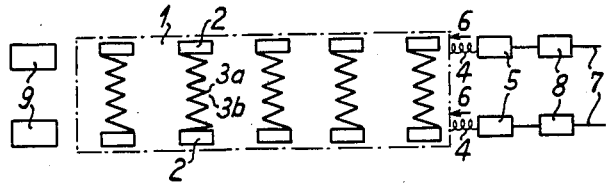
Figure 2:
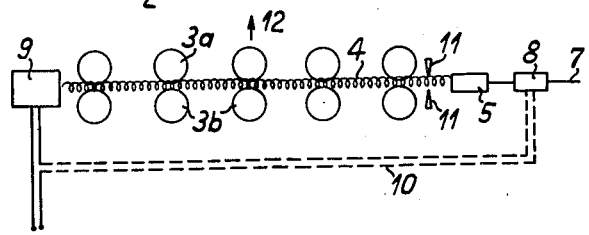

The clamping tongs 2 according to Figs. 3 to 6 comprise a support 20 which is mounted on two round bars 21 and 22 which are fixed on the machine frame (not shown). On these bars all the tongs of the lower row (see Fig. 1) are mounted. By means of a clamping screw 23 the support 20 can be clamped fast on the bar 22 at the desired distance from the adjacent tongs, so that this distance can be adjusted very easily in accordance with the width desired of the mattress or the like to be produced. Above the bars 21, 22 the machine frame comprises two more bars for the mounting of the upper row of tongs. The upper tongs are constructed exactly like the lower ones, but are obviously mounted in the inverse position.

The stationary jaw 24 of the tongs 2 consists of a portion 25 of the support 20 and of a clamping piece 26 which is connected by a screw 27 with the portion 25 of the support. The moveable jaw 28 consists of a jaw body 29 and of a clamping piece 31 fixed thereto by means of a screw 30. The clamping piece 31 has a projecting lug 32 which in the closed position of the tongs covers part of the clamping piece 26. The clamping pieces 26 and 31 are for better clarity, not shown in section, but in elevation.

The jaw body 29 is connected by means of a round key 33 to the piston rod 34 of a piston 35, which is reciprocatable in a cylinder 36. Compressed air, which is alternately admitted into and discharged from the cylinder 36 through the ports 37 and 38, respectively, serves for operating the piston 35. Tension rods are denoted 39, by means of which the cylinder 36 is attached to the support 20.

On the support 20 moreover a bracket 40 consisting of sheet metal is attached which has two lateral lugs 41 and 42 bent downwardly which are attached to the support by means of screws 43 and 44, or 45, respectively. The bracket 40 serves as a rest and guide for the end turn of a coiled spring $3^1$ when it is brought by hand in the direction of the arrow 46 into its feed position $3^2$, in which the forward portion of the lower end turn has jerked down on to a shoulder 47 of the bracket. In order to impart the loading required therefore to the spring, the bracket 40 is provided with an inclined ramp 48, the distance between the entrance edge 49 and the corresponding entrance edge of the bracket of the upper tongs arranged symmetrically corresponding to the length of the unloaded spring.

The tongs 2 are provided with an ejector device 50 in order to eject the two parts clamped together by the end turns of the coiled springs from the tongs after their connection. The device 50 has an ejector member 51 the shape of which can be seen best in Figs. 4, 5 and 8. In Fig. 4 the ejector member is bounded on the right hand side by the broken dotted line 51 and on the left hand side by the straight dividing line of the jaws. The ejector member 51 is mounted on a pin 52 which is vertically shiftable in a bore 53 of the support 20. On the lower end of the pin 53 by means of nuts 54 a forked member 55 is fixed, which embraces a pin 56. This pin 56 is arranged on the free end of a lever 57 which is fixed by means of a cotter 58 to a rocker shaft 59, which extends parallel to the bars 21 and 22. The shaft 59 is turned to-and-fro by means of a rocker device 60 illustrated in the Figs. 11 and 12, as will be explained later more in detail.

On the free end of the piston rod 34 a sleeve 61 is fixed by means of a pin 62. Over this sleeve 61 a holder 63 is pushed, which has an arm 64 which is provided with two upwardly directed lugs 64a (see also Fig. 12) having apertures 65 wherein a flat iron bar 66 is located with lateral play 67. The flat bar 66 extends parallel to the round bars 21 and 22 and is held in unison by all holders 63 of the lower row of tongs; it ensures that all moveable jaws 28 of this row come practically simultaneously into the same position, even when the pistons 35 driving these jaws individually do not operate accurately synchronously. The play 67 allows, however, a certain freedom of movement to the individual moveable jaws for reasons to be explained later in more detail. In case a particular obstacle, say a tool getting between the jaws 24, 28 of a pair of tongs, should prevent the closing of these tongs, a breakage-safeguard 68 is effectively provided between the sleeve 61 and holder 63. The same consists of a pointed pin 69 which is forced by a spring 70 against the sleeve 61 so that its point rests in a notch 71 provided in the sleeve. A screw 73 provided with a locknut 72 permits to regulate the loading of the spring 70. The screw 73 is screwed into a plug 74 which is in turn screwed fast in the holder 63. When overloading the breakage-safeguard 68, the point of the pin 69 jumps out of the notch 71, whereby any damage is prevented.

A guide device 75 for the coil (see Figs. 4 to 6) comprises a mounting block 76 which is attached to the support 20 by means of two screws 77. A flap 78 (see Fig. 6), which is omitted from Fig. 5, is mounted on two pins 79 fixed to the block 76 so loosely that it can be swung into the position 78′ shown in chain-dotted lines. The flap 78 has an arm 80 the turned-up end of which is engaged by a tension spring 81 which passes through a bore 82 of the block 76 and engages at its other end a transverse pin 83. On the block 76 a groove 84 is provided to which an arcuate projection 85 of the flap 78 is juxtaposed in such a manner that the groove and the projection in the rest position of the flap form together a substantially cylindrical guide for the coiled wire 4.

This guide 84, 85 is necessary in order that the coil 4 advancing screw-wise gets correctly between the clamping jaws 26 and 31, so that the continued screw-wise advance of the coiled wire is assured. When the coiled springs $3a$ and $3b$ attached to one another are thrown out of the opened tongs by the ejector member 51, the coiled wire 4 forces the guide projection 85 of the flap 78 upward, so that the latter is swung into the chain-dotted position 78′, and the coiled wire assumes the position 4′. In this position 85′ the guide projection no longer prevents the ejection of the coiled wire, whereupon the flap 78 returns to its rest position under the action of the spring 81.

The manner of operation of the tongs will now be explained in more detail with reference to Figs. 3 and 7 to 10. After the lower end turns of the coiled springs $3a$ and $3b$, which are represented in Fig. 3 in the clamped position, have been connected by the coiled wire 4 with one another, the movable jaw 28 is moved by the piston 35 in the direction of the arrow 86. Before the jaw 28 has reached the position of maximum opening, the inclined surface 87 of the jaw body 29 raises the rear portion of the lower end turn of the spring $3b$ and the front portion of the lower turn of the new spring on to the lug 32 of the clamping piece 31, as shown in Fig. 7. The new spring is now in the position $3^3$. Then the shaft 59 starts turning in the clockwise direction, whereby the ejector member 51 is moved upward and thereby ejects the end turn portions of the coiled springs $3a$ and $3b$ connected by the coiled wire 4 from the tongs as shown in Fig. 8. In this Fig. 8 also the maximum opening position of the moveable jaw 28 is illustrated. The new spring is in the position $3^4$, which is similar to the feed position $3^2$, however with the difference, that the forward portion of the lower end turn is already located between the jaws 24 and 28.

Figure 9:
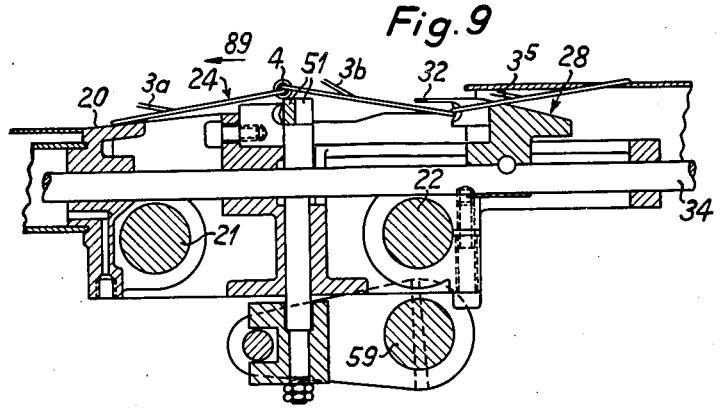
Figure 10:
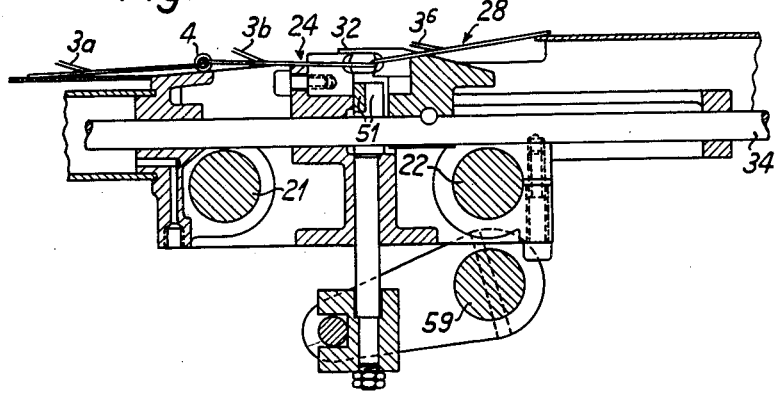

At the return motion of the jaw 28 in accordance with the arrow 88 the lug 32 prevents the rear portion of the lower end turn of the spring $3b$ and the forward portion of the new spring from jumping out of the tongs, as will be seen best in Fig. 9. In the position shown in Fig. 9 the ejector member 51 is still in its upper position so that the springs $3a$ and $3b$ are pushed further on in the direction of the arrow 89 by the continued closing movement of the jaw 28.

While the jaw 28 continues its closing movement, the shaft 59 is turned in the counter-clockwise direction whereby the ejector member 51 is returned to its rest position. This rest position is reached according to Fig. 10 already shortly before the closing of the tongs. After the complete closing of the tongs the position of Fig. 3 is reached again, the new spring having moved, through the positions marked $3^3$ to $3^6$ in Figs. 7 to 10, into the position of the spring 3b, while the latter has then assumed the former position of the spring 3a.

Figs. 11 and 12 illustrate the device 60 for turning the rocker shaft 59 to-and-fro. The same comprises a support 90 similar to the support 20 to which a like cylinder 36 is attached as to the supports 20. On the piston rod 34 of the piston 35 likewise a holder 63 is attached, which holds the flat bar 66 with some play 67 and is provided with a breakage-safeguard 68. The support 90 is mounted at the end of the row of tongs 2 likewise on the round bars 21 and 22. In Fig. 12 the bar 22 is omitted in order to show the parts lying under the same.

Instead of the jaw body 29 here a slider body 91 is connected to the piston rod 34 by means of a round key 92. On the slider body 91 two abutment rollers 93 and 94 are rotatably mounted by means of screws 95, 96, respectively. On the bar 21 a two-armed lever 97 is pivotally mounted, the upper arm of which is denoted 98 and the lower arm 99. The hub 100 of the lever 97 is secured in its position on the bar 21 by means of the support 90 and of a collar 101. A spring 103 engaging on the lever arm 98 through the pin 102 tends to turn the lever 97 in the counter-clockwise sense of Fig. 11, whereby the upper narrow side of the lever arm 98 comes to bear from below on the roller 94.

On the shaft 59 a lever 104 is clamped fast by means of two clamping screws 105. On the lever 104 a pin 106 is fixed which is engaged by a spring 107 which in turn is attached to a pin 108 fixed to the support. This spring 107 which is omitted in Fig. 11, tends likewise to turn the lever 104 in the counter-clockwise sense of Fig. 11. The lever 104 cannot however move in this direction beyond its rest position shown in full lines, because at its turning in this direction the ejector members 51 are moved by the shaft 59 into their lowest position, in which they abut at the point 109 (see Fig. 5) on the support 20.

On the shaft 59 moreover a further lever 110 is attached by means of a clamping screw 111a, which lever is covered in Fig. 12 by the lever arm 98. The lever arm 99 forms a hook 111, which may hook itself to the free end of the lever 110. The lever arm 98 on the other hand has a downwardly turned end 112.

The rocker device 60 operates as follows:

The piston 35 is moved to-and-fro synchronously with the corresponding pistons 35 for the tongs 2. When the slider body 91 is moved to the right of Fig. 11, the roller 94 gets over the turned-down end 112 of the lever arm 98, which consequently turns in the counter-clockwise direction under the action of the spring 103, until the end face of the hook 111 abuts the end face of the lever 110. Shortly afterwards the roller 93 abuts a ramp 113 provided on the free end of the lever 104, whereby the lever 104 and accordingly also the shaft 59 and the lever 110 are turned in the clockwise direction. The lever 110 thereby gets into the position 110' shown in chain-dotted lines in which its end face slides off that of the hook 111, so that the lever 110 is hooked to the hook 111 and is arrested by the same. The turning of the shaft 59 which begins in the position of the jaw 28 corresponding to Fig. 7 and of the slider body 91, respectively, effects the described ejection movement of the ejector member 51. At the continued movement of the piston rod 34 the same gets eventually into the end position 34' shown in chain-dotted lines. The end positions of the slider body, of the rollers, of the arms of the lever 97 and of the holder are designated 91', 93', 94', 98', 99' and 63', respectively.

On the return stroke of the piston rod 34 the lever 97 is turned back into its starting position by the roller 94 running on to the turned down end 112 of the lever arm 98, whereby the lever 110 is disengaged, and is likewise turned back into its starting position by the spring 107. The corresponding rotary return movement of the shaft 59 effects the returning of the ejector member 51, which begins in the position of the tongs according to Fig. 9.

When inserting the springs in the feed position 3² one must take care that a knot (not shown) which is always present at the end turn of the spring, is located neither in front nor on the rear, but laterally lest it may get between the clamping pieces 26 and 31. Should the operative insert the spring so that the latter is the case, the tongs concerned cannot close completely, and the coiled wire 4 will not be able to wind itself through and around the spring turns to be connected which entails a slipping of the wire 7 in the feeder device 8 accompanied by a strong whistling noise. The operative will then switch off the feed, discharge the air from the cylinders 36, and place the end turn of the spring concerned into the correct position. Owing to the play 67 of the flat bar 66 in the apertures 65, the incomplete closing of the tongs concerned has no effect on the other tongs, while tripping of the breakage-safeguard 68 is obviated. The latter responds—as mentioned already—only to severe faults in the operation of the associated tongs.

The clamping device described, in which the moveable jaw 29 reciprocates only in the horizontal plane, is extraordinarily simple and reliable in operation as compared with the clamping means with advance feed as hitherto known. As compared with the usual clamping devices without advance feed the increase in production is very considerable.

Instead of the bracket 40 with its comparatively long ramp 48 one may provide alternatively a much shorter bracket and may then arrest in the feed position the rear portion of the lower end turn of the cushion spring on a shoulder of the bracket instead of the forward portion thereof, while the end turn proper supports itself on lateral guides. In this case the piston rods are preferably not connected with one another by a compensating bar arranged below the brackets, but one will extend the piston rods on the other side beyond the cylinders and use a flexible tube connecting these extensions of the piston rod as a compensating means. When using such a tube any play in its mounting as well as a breakage-safeguard may be dispensed with owing to the flexibility of the tube.

While I have described herein and illustrated in the accompanying drawings what may be considered a typical and particularly useful embodiment of my said invention, I wish it to be understood that I do not limit myself to the particular details and dimensions described and illustrated, for obvious modifications will occur to a person skilled in the art.

What I claim as my invention and desire to secure by Letters Patent, is:

1. In a machine for interconnecting the ends of coil springs for producing spring assemblies, the combination comprising, a fixed frame member, a plurality of clamping tongs arranged in a row on said frame member, each clamping tong comprising a fixed jaw and a complementary movable jaw reciprocally mounted for movement to and away from its fixed jaw between open and closed positions in a linear direction, pneumatic means for reciprocating each of said movable jaws between its open and closed positions, a bracket for each of said clamping tongs fixed with respect to said frame member and adapted to support one end of a coil spring positioned at a feed position prior to closure of its respective jaw, each of said movable jaws having a projecting lug portion operative when said movable jaw is in open position to hook about said one end of its coil spring being fed and advance it against its fixed jaw upon closure, said complementary jaws each having means to straighten and clamp together arcuate portions of said ends of successive pairs of coils being fed to the clamping tongs as the moving jaws reciprocate, mechanism for guiding a helical wire about said clamped together portions of said springs while said jaws are in closed position for securely interconnecting them, and means including a vertically reciprocating pin for ejecting said interconnected coil end portions during movement of the movable jaws to their open position.

2. A mechanism as defined in claim 1 wherein said pneumatic means for reciprocating said movable jaws comprises a pneumatic cylinder fixed with respect to said frame member for each clamping tong, a piston member reciprocable in each of said cylinders and connected with respective ones of said movable jaws, and lost motion mechanism interconnecting said piston members and constraining said piston members to reciprocate substantially in unison.

3. The mechanism as defined in claim 2 wherein said lost motion mechanism comprises an arm with a rectangular opening connected to each of said piston members, and a bar of smaller width than the width of said openings extending laterally through said openings.

4. The mechanism as defined in claim 2 including a breakage safeguard mechanism for each of said movable jaws, each of said breakage mechanisms comprising a holder member slidably mounted on one each of said piston members, a pointed spring-loaded pin slidably fitted in each of said holders with its point resiliently engaging a notch in the associated piston member, said lost motion mechanism comprising a rectangular opening in each of said holders and a flat bar passing through said openings in said holders with lateral play.

5. The mechanism as defined in claim 4 wherein each of said movable jaws is provided with a sloping ramp portion operative when said movable jaw is moving in the opening direction to raise an end portion of the coil being fed over the top of its projecting lug portion to drop between the complementary associated jaws under the compressional force of the coil being fed.

6. A mechanism as defined in claim 1 including a second plurality of clamping tongs inverted and arranged in spaced relation above and in alignment with said lower clamping tongs and operative in synchronism with said lower clamping tongs, an inverted bracket for each of said inverted clamping tongs fixed with respect to said frame member and adapted to support the other end of a coil spring positioned at a feed position prior to closure of its respective jaw, said brackets each being provided with a sloping ramp and a shoulder, the coil springs being shifted along said ramps and being slightly compressed thereby and then being allowed to fall against said shoulders under the compressional force of said springs being fed and into the feed position defined by said shoulder.

7. A mechanism as defined in claim 1 wherein said ejecting means comprises an ejector member attached to the upper end of each of said pins and a rocker shaft kinematically connected to and operating all said pins.

8. A clamping device as claimed in claim 7, comprising two bars on which all the said tongs of one row are filed, and a rocker device also filed on said two bars and operatively connected to the said rocker shaft turning the same to-and-fro in operation.

9. A clamping device as claimed in claim 8, wherein each of the said tongs has a support slidably mounted on and adapted to be clamped to the said two bars.

10. A clamping device as claimed in claim 8, wherein the said rocker device comprises a slider body having two abutments, a pneumatic operated jack having a piston connected to the said slider body in the sense of moving the same to-and-fro, a spring-loaded lever and a second lever both mounted on the said rocker shaft, the said spring-loaded lever being engaged and rocked by one of the said two abutments at the forward stroke of the said piston, a spring-loaded two armed lever pivotally mounted on one of the said bars, one arm of the said two-armed lever being released by the second of the said abutments at the forward stroke of the said piston in such a manner that the second arm of the said two armed lever interengages with the said second lever, the said first arm having a turned down end engaged by the said second abutment at the return stroke of the said piston in the sense of releasing the interengagement of the said second arm and the said second lever and allowing the said rocker shaft to be turned back by the spring loading of the said spring loaded lever.

11. A clamping device as claimed in claim 10, wherein the said pneumatic jack of the said rocker device is identical with the said pneumatic means of the said tongs and is controlled synchronously therewith, and comprising a holder attached to the piston of the pneumatic jack of the said rocker device, the said flat bar passing with play also through the said holder.

12. The mechanism as defined in claim 1 wherein each of said movable jaws is provided with a sloping ramp portion operative when said movable jaw is moving in the opening direction to raise an end portion of the coil being fed over the top of its projecting lug portion to drop between the complementary associated jaws under the compressional force of the coil being fed.

References Cited in the file of this patent
UNITED STATES PATENTS

| | | |
|---|---|---|
| 2,286,326 | Zimmerman et al. | June 16, 1942 |
| 2,388,106 | Woller | Oct. 30, 1945 |
| 2,470,812 | Gauci et al. | May 24, 1949 |
| 2,742,934 | Weston | Apr. 24, 1956 |
| 2,749,948 | Gauci | June 12, 1956 |